(12) United States Patent
Yoshida

(10) Patent No.: US 8,383,940 B2
(45) Date of Patent: Feb. 26, 2013

(54) BUS BAR ATTACHING MEMBER AND ROOM LAMP FOR VEHICLE HAVING BUS BAR ATTACHING MEMBER

(75) Inventor: Kosuke Yoshida, Makinohara (JP)

(73) Assignee: Yazaki Corporation, Tokyo (JP)

( * ) Notice: Subject to any disclaimer, the term of this patent is extended or adjusted under 35 U.S.C. 154(b) by 149 days.

(21) Appl. No.: 13/019,597

(22) Filed: Feb. 2, 2011

(65) Prior Publication Data

US 2011/0186327 A1  Aug. 4, 2011

(30) Foreign Application Priority Data

Feb. 3, 2010  (JP) ................... 2010-021842

(51) Int. Cl.
*H02G 5/00* (2006.01)
*H02G 3/16* (2006.01)

(52) U.S. Cl. ............ 174/68.2; 174/72 B; 174/88 B; 439/76.2; 439/949; 361/624; 361/648

(58) Field of Classification Search ............ 174/72 B, 174/71 B, 88 B, 70 B, 99 B, 129 B, 133 B, 174/149 B, 68.2; 361/600, 601, 624, 627, 361/637, 639, 648, 675, 641, 611, 699.2, 361/34; 439/212, 213, 114, 210, 76.1, 76.2, 439/949, 55, 66
See application file for complete search history.

(56) References Cited

U.S. PATENT DOCUMENTS

| | | | | |
|---|---|---|---|---|
| 6,325,640 | B1 * | 12/2001 | Kasai | 439/76.2 |
| 6,402,570 | B2 * | 6/2002 | Soga et al. | 439/76.2 |
| 6,619,963 | B2 * | 9/2003 | Nagai | 439/34 |
| 7,207,847 | B2 * | 4/2007 | Nagai et al. | 439/699.2 |
| 7,332,673 | B2 * | 2/2008 | Shimoda et al. | 174/68.2 |
| 8,118,605 | B2 * | 2/2012 | Yoshida | 439/76.2 |
| 2005/0258764 | A1 | 11/2005 | Nagai et al. | |

FOREIGN PATENT DOCUMENTS

JP   2005-329883 A   12/2005

* cited by examiner

*Primary Examiner* — Angel R Estrada
(74) *Attorney, Agent, or Firm* — Sughrue Mion, PLLC

(57) ABSTRACT

A bus bar attaching member 1 forming a room lamp 10 for a vehicle includes a housing 2 and a plurality of bus bars 3a, 3b, 3h and 3i insert molded in the housing 2. Further, in wiring parts 5 of the bus bars 3a and 3b, impact absorbing parts 6a and 6b are provided that prevent an impact when an electric wire 8 is pressed in contact with pressure contact parts 4 from being transmitted to parts attaching parts 7. The impact absorbing parts 6a and 6b are configured in U shaped forms by first absorbing parts 61a and 61b extending in the directions intersecting virtual straight lines K1 and K2 that connect bottom walls 40 of the pressure contact parts 4 to the parts attaching parts 7, second absorbing parts 62a and 62b and third absorbing parts 63a and 63b.

4 Claims, 6 Drawing Sheets

BUS BAR ATTACHING MEMBER AND ROOM LAMP FOR VEHICLE HAVING BUS BAR ATTACHING MEMBER

BACKGROUND OF THE INVENTION

1. Field of the Invention

The present invention relates to a bus bar attaching member that a bus bar is insert molded to a housing and a room lamp for a vehicle having the bus bar attaching member.

2. Description of the Related Art

As a usual room lamp attached to a ceiling of a vehicle, a structure is known that a bus bar formed by punching and bending a metal plate is attached to a housing made of a synthetic resin (for instance, see patent literature 1). FIG. 6 is a perspective view showing a bus bar forming the usual room lamp for a vehicle.

As shown in FIG. 6, the bus bar 103 includes a plurality of press-contact parts 104 with which an electric wire is pressed in contact, a pair of parts attached parts 107 to which a bulb as a light source is attached, a plurality of contact point parts 108 that are electrically connected to a switch for turning on and off the supply of an electric power to the bulbs from the electric wire, a plurality of wiring parts 105 that connects together the press-contact parts 104, the parts attaching parts 107 and the contact point parts 108 in accordance with a prescribed pattern, a plurality of engaging pawls 102 pressed in and engaged with the housing and bridge parts 109 that connects the plurality of wiring parts 105 together.

The press-contact part 104 includes a bottom wall 140 and a pair of press-contact blades 141 standing upright form both edges of the bottom wall 140. The electric wire is pressed in contact with the one pair of press-contact blades 141 and electrically connected to the one pair of press-contact blades 141.

The one pair of parts attaching parts 107 respectively include plate parts 170 connected to the wiring parts 105 and one pairs of holding parts 171 connected to both the edges of the plate parts 170. The bulb has one end part sandwiched between the one pair of holding parts 171 of the one parts attaching part 107 and the other end part sandwiched between the one pair of holding parts 171 of the other parts attaching part 107 and is electrically connected to the one pair of parts attaching parts 107.

The wiring part 105 is formed in a belt shape with a constant width of a material.

The engaging pawls 102 stand upright from edges of the wiring parts 105 and are pressed in and engaged with the housing as described above.

The above-described bridge parts 109 are provided to easily attach the bus bar 103 to the housing, and after the bus bar 103 is attached to the housing, the bridge parts 109 are cut and removed.

The room lamp for a vehicle having the above-described bus bar 103 is assembled in such a way as described below. Initially, the bus bar 103 formed by previously punching and bending the metal plate is attached to the housing by pressing in and engaging the engaging pawls 102 with the housing. Then, the bridge parts 109 are cut and removed. Then, the bulb is attached to the one pair of parts attaching parts 107 to press the electric wire in contact with the press-contact parts 104. Finally, a cover is attached to the housing. In such a way, the room lamp for a vehicle is assembled.

Patent literature 1: JP-A-2005-329883

However, the usual room lamp for a vehicle having the above-described bus bar 103 has below-described problems. Namely, when the electric wire is pressed in contact with the press-contact parts 104, there is a problem that the press-contact parts 104 and the wiring parts 105 in the peripheries of the press-contact parts 104 may be possibly deformed due to an impact during a press-contact operation. Further, there is a problem that the holding property of the bulb attached to the one pair of parts attaching parts 107 may be possibly deteriorated due to the deformation. Further, since the bus bar 103 is configured in such a way that the engaging pawls 102 stand upright in opposite directions to the directions that the press-contact blades 141 stand upright, a dimension in the direction of height of the bus bar 103 and the housing is undesirably enlarged. Thus, a problem arises that attaching conditions to the vehicle are severely restricted. Further, when the above-described bus bar 103 is attached to the housing, since the plurality of engaging pawls 102 need to be pressed in and engaged therewith or the bridge parts 109 need to be cut and the number of assembling processes is large, a problem arises that a const is increased.

Further, the above-described problems arise not only in the room lamp for a vehicle, but also in other electronic devices having the above-described bus bar and the housing.

Thus, by paying attention to the above-described problems, it is an object of the present invention to provide a bus bar attaching member in which an impact during the press-contact of an electric wire may be hardly transmitted to parts attaching parts so as to prevent electronic parts from getting out of the parts attaching parts and the number of assembling processes is small, and a room lamp for a vehicle having the bus bar attaching member.

SUMMARY OF THE INVENTION

In order to achieve the above-described object, the present invention defined in a first aspect of the invention provides a bus bar attaching member having a housing and a bus bar formed by punching and bending a metal plate and insert molded the housing, characterized in that the bus bar includes a press-contact part formed by a bottom wall and pressure contact blades standing upright from edges of the bottom wall and electrically connected to an electric wire with the electric wire pressed in contact with the pressure contact blades, an parts attaching part to which an electronic parts is electrically connected and a wiring part that connect the bottom wall to the parts attaching part; the wiring part includes an impact absorbing part that prevents an impact when the electric wire is pressed in contact with the pressure contact blades from being transmitted to the parts attaching part in a part located between the bottom wall and the parts attaching part; and the impact absorbing part is formed by a first absorbing part extending from a part in the vicinity of the bottom wall in the direction intersecting a virtual straight line that connects the bottom wall to the parts attaching part, a second absorbing part extending to the parts attaching part side along the direction intersecting the first absorbing part from an end part of the first absorbing part separating from the bottom wall and a third absorbing part extending in the direction intersecting the second absorbing part from an end part of the second absorbing part separating from the first absorbing part.

The invention defined in a second aspect of the invention in the invention according to the first aspect of the invention is characterized in that the bottom wall, the wiring part and the parts attaching part are arranged on the same plane.

The invention defined in a third aspect of the invention in the invention according to the first aspect of the invention is characterized in that the impact absorbing part is formed by bending the wiring part and the first absorbing part stands upright in the same direction as that of the pressure contact blades from a part in the vicinity of the bottom wall.

The invention defined in a fourth aspect of the invention provides a room lamp for a vehicle having the bus bar attaching member according to the first aspect of the invention.

According to the invention of the first aspect of the defined in the first aspect of the invention, since the wiring part includes an impact absorbing part that prevents an impact when the electric wire is pressed in contact with the pressure contact blades from being transmitted to the parts attaching part in a part located between the bottom wall and the parts attaching part; and the impact absorbing part is formed by a first absorbing part extending from a part in the vicinity of the bottom wall in the direction intersecting a virtual straight line that connects the bottom wall to the parts attaching part, a second absorbing part extending to the parts attaching part side along the direction intersecting the first absorbing part from an end part of the first absorbing part separating from the bottom wall and a third absorbing part extending in the direction intersecting the second absorbing part from an end part of the second absorbing part separating from the first absorbing part, the bus bar attaching member can be provided in which the impact during the pressure contact of the electric wire is hardly transmitted to the parts attaching part, so that the electronic parts can be prevented from getting out of the parts attaching part and the number of assembling processes is small.

According to the second aspect of the invention, since the bottom wall, the wiring part and the parts attaching part are arranged on the same plane, the bus bar attaching member can be provided in which the enlargement of the dimension of height can be suppressed.

According to the third aspect of the invention, since the impact absorbing part is formed by bending the wiring part and the first absorbing part stands upright in the same direction as that of the pressure contact blades from a part in the vicinity of the bottom wall, the bus bar attaching member can be provided in which the enlargement of the dimension of height can be suppressed.

According to the fourth aspect of the invention, since the bus bar attaching member according to the first aspect of the invention is provided, the room lamp for a vehicle can be provided in which the impact during the pressure contact of the electric wire is hardly transmitted to the parts attaching part, so that the electronic parts can be prevented from getting out of the parts attaching part and the number of assembling processes is small.

DESCRIPTION OF THE PREFERRED EMBODIMENTS

First Embodiment

A "room lamp 10 for a vehicle" having a "bus bar attaching member 1" according to a first embodiment of the present invention will be described by referring to FIG. 1 to FIG. 3. The room lamp 10 for a vehicle of the present invention is a device attached to an opening for attaching the lamp provided in a roof trim as an internal wall material for covering a vehicle body panel of a motor vehicle to light an occupant's room of the motor vehicle.

Figure 1:
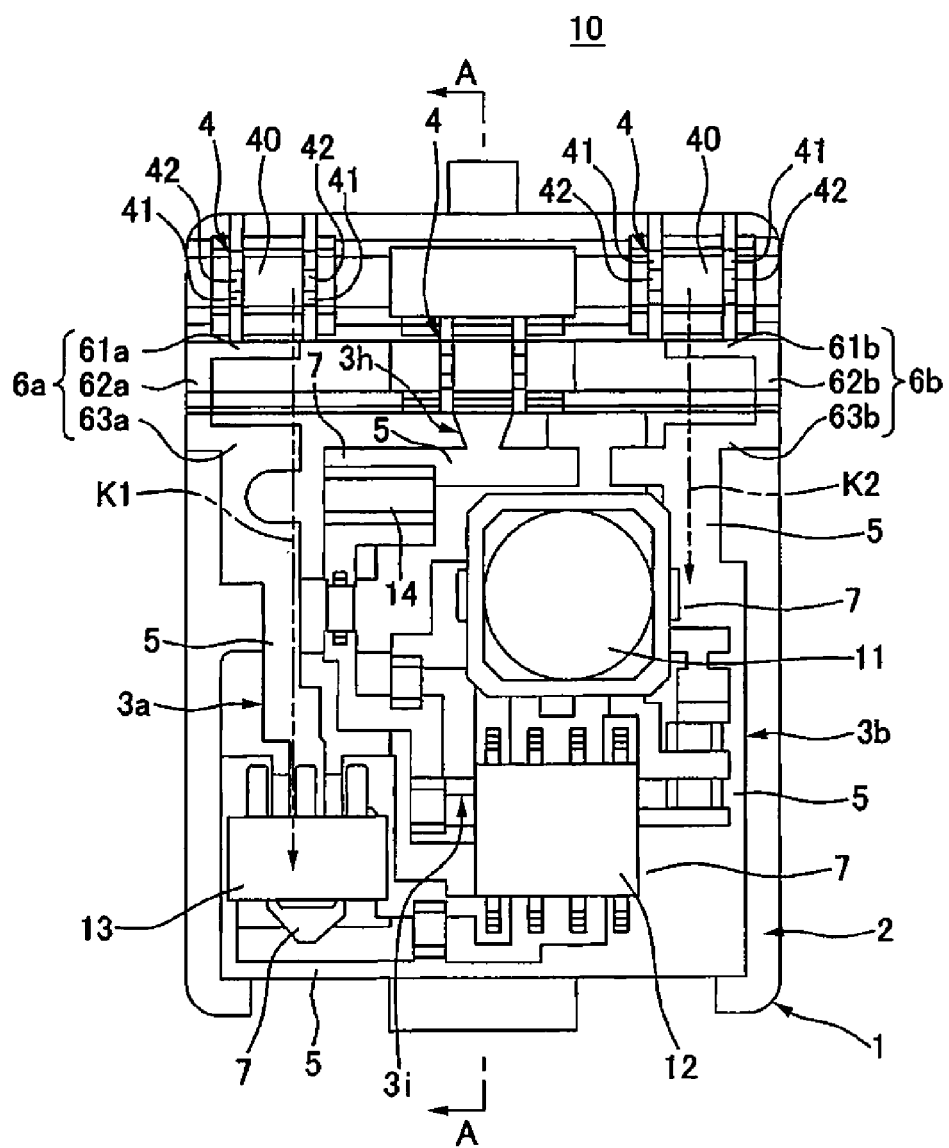
FIG. 1 is a plan view showing a bus bar attaching member provided with a bus bar according to a first embodiment of the present invention and a room lamp for a vehicle.
Figure 2:
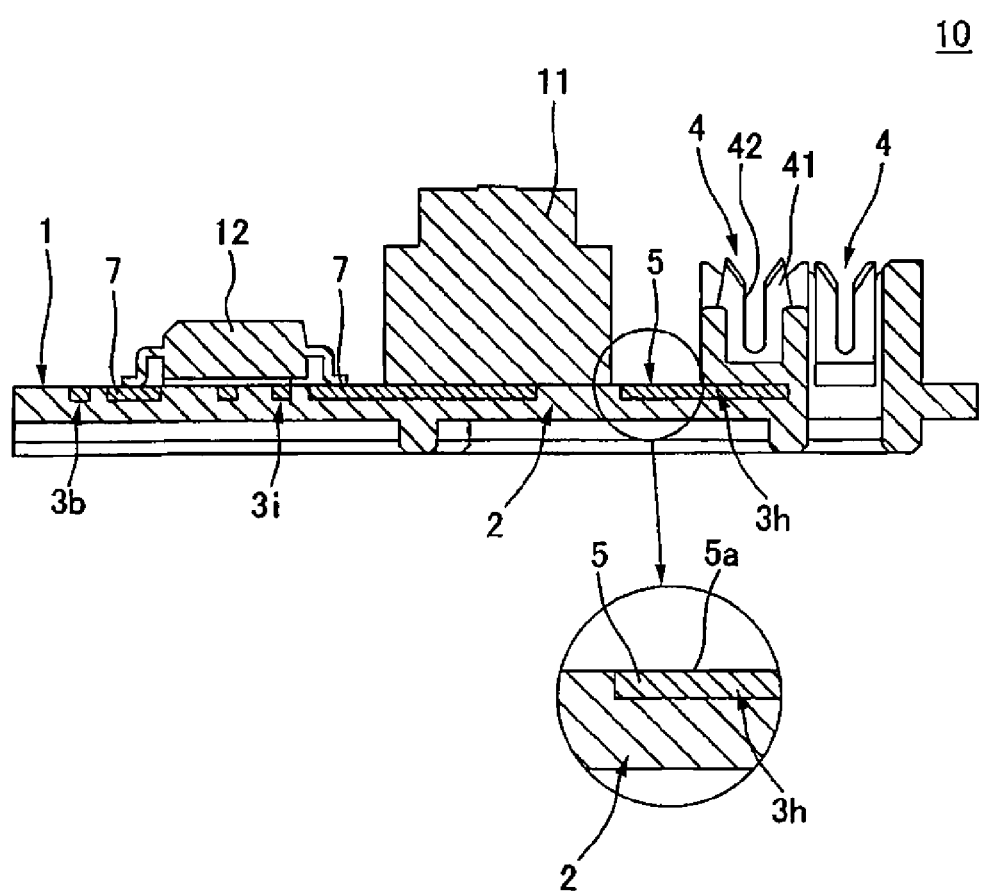
FIG. 2 is a sectional view taken along a line A-A shown in FIG. 1.

As shown in FIG. 1 and FIG. 2, in the room lamp 10 for a vehicle, are provided a bus bar attaching member 1 in which a plurality of bus bars 3a, 3b, 3h and 3i are insert molded to a housing 2 made of a synthetic resin, a plurality of electronic parts 11, 12, 13 and 14 mounted on the surfaces of the plurality of bus bars 3a, 3b, 3h and 3i, a switch for turning on and off the room lamp 10 for a vehicle which is not shown in the drawing and a cover attached to the housing 2 which is not shown in the drawing. The electronic parts 11 is an LED lamp as a light source.

Further, the room lamp 10 for a vehicle is attached to the opening for attaching the lamp in a direction vertically opposite to the direction shown in FIG. 2. Further, a "dimension of height" of the room lamp 10 for a vehicle means a dimension of a vertical direction in the direction of a sheet surface in FIG. 2. Namely, the "dimension of height" of the room lamp 10 for a vehicle means a dimension of a direction along a direction in which a below-described pressure contact blade 41 stands upright from a bottom wall 40.

The plurality of bus bars 3a, 3b, 3h and 3i are formed by punching and bending a metal plate. In the bus bars 3a, 3b, 3h and 3i respectively, parts attaching parts 7 to which lead parts of the electronic parts 11, 12, 13 and 14 are attached and electrically connected and wiring parts 5 are provided. Further, in the bus bars 3a, 3b and 3h of the plurality of bus bars 3a, 3b, 3h and 3i, pressure contact parts 4 are provided with which an electric wire 8 is pressed in contact to be electrically connected in addition to the above-described parts attaching parts 7 and the wiring parts 5.

Figure 3:
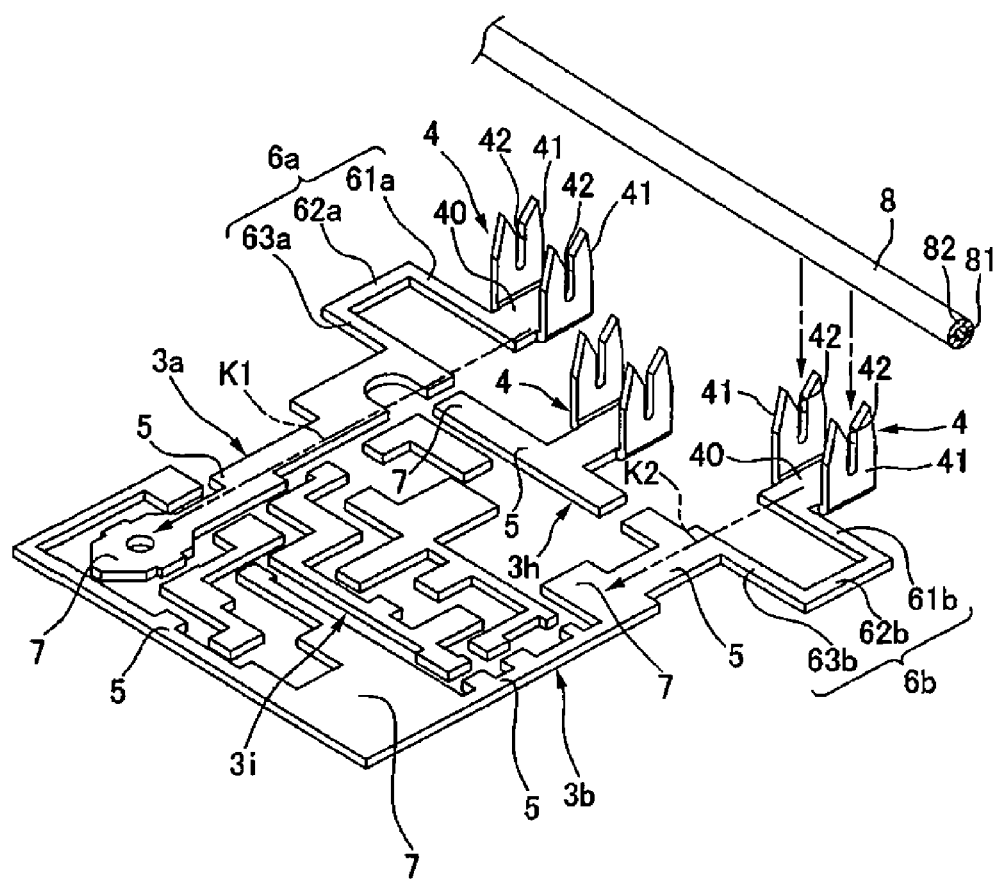
FIG. 3 is a perspective view of the bus bar shown in FIG. 1.

The parts attaching parts 7 are formed in plate shapes a shown in FIG. 3. Further, as shown in FIG. 2, the parts attaching parts 7 are embedded in the housing 2 so that one side surfaces to which the lead parts of the electronic parts 11, 12, 13 and 14 are attached are exposed. In the present invention, "embedded in the housing 2" means a state that the parts attached parts are embedded in the housing 2 and parts in contact with the housing 2 are bonded to the housing 2. Further, the lead parts electrically connected to the one surfaces of the parts attaching parts 7 by soldering.

As described above, in the room lamp 10 for a vehicle, since the electronic parts 11, 12, 13 and 14 are mounted on the surfaces of the bus bars 3a, 3b, 3h and 3i, the enlargement of the dimension of height can be suppressed.

The pressure contact part 4 is formed, as shown in FIG. 2 and FIG. 3, by a flat plate shaped bottom wall 40 and a pair of pressure contact blades 41 standing upright from both edges of the bottom wall 40 in directions opposed to each other. Further, in each of the pressure contact blades 41, a slit 42 is formed into which the electric wire 8 is inserted. In the pressure contact part 4, the bottom wall 40 is embedded in the housing and the one pair of pressure contact blades 41 protrude from the surface of the housing 2. In such a pressure contact part 4, when the electric wire 8 is inserted into the slit 42, the one pair of pressure contact blades 41 break through a coat part 82 of the electric wire 8 to come into contact with a core wire 81 and are electrically connected to the core wire 81. In such a way, a phenomenon that the electric wire 8 is inserted into the slit 42 and the contact pressure blades 41 break through the coat part 82 of the electric wire 8 to come into contact with the core wire 81 is expressed, in the present invention, in such a way that the "electric wire 8 is pressed in contact with the pressure contact part 4" or the "electric wire 8 is pressed in contact with the pressure contact blades 41".

As shown in FIG. 3, the electric wire 8 is a coated electric wire having an electrically conductive core wire 81 coated with the insulating coat part 82 and a round section. The electric wire 8 is connected to a power source and electrically connected to the pressure contact part 4 to supply an electric power to the LED lamp 11.

The wiring part 5 is wired between the parts attaching part 7 and other parts attaching part 7 or between the bottom wall 40 of the pressure contact part 4 and the parts attaching part 7. Namely, the wiring part 5 connects the parts attaching parts 7 together and connects the bottom wall 40 of the pressure contact part 4 to the parts attaching part 7. The wiring part 5 is arranged on the same plane as that of the parts attaching part 7 and the bottom wall 40. Namely, the wiring part 5 is extended along a planar direction of the bottom wall 40 from the edge of the bottom wall 40 and extended along a planar direction of the parts attaching part 7 from the edge of the parts attaching part 7. Such a wiring part 5 is, as shown in FIG. 2, embedded in the housing 2 so that one surface 5a is exposed. Further, the "one surface 5a" means a surface located on the same plane as the "one surfaces of the parts attaching parts 7 to which the lead parts are attached" and a "surface of a side on which the pressure contact blades 41 of the bottom wall 40 stand upright".

In the wiring parts 5 of the bus bars 3a and 3b on which the pressure contact parts 4 are provided, in parts located between the bottom walls 40 of the pressure contact parts 4 and the parts attaching parts 7, impact absorbing parts 6a and 6b are provided which prevent an impact when the electric wire 8 is pressed in contact with the pressure contact blades 41 from being transmitted to the parts attaching parts 7.

The above-described impact absorbing part 6a is configured in a U shaped form, as shown in FIG. 1 and FIG. 3, by a first absorbing part 61a extending from a part in the vicinity of the bottom wall 40 in the direction intersecting a virtual straight line K1 that connects the bottom wall 40 to the parts attaching part 7, a second absorbing part 62a extending to the parts attaching part 7 side along the direction intersecting the first absorbing part 61a from an end part of the first absorbing part 61a separating from the bottom wall 40 and a third absorbing part 63a extending in the direction intersecting the second absorbing part 62a from an end part of the second absorbing part 62a separating from the first absorbing part 61a. Further, the width of a material of the first absorbing part 61a, the second absorbing part 62a and the third absorbing part 63a is formed to be narrower than that of other part of the wiring part 5.

The above-described impact absorbing part 6b is configured in a U shaped form, as shown in FIG. 1 and FIG. 3, by a first absorbing part 61b extending from a part in the vicinity of the bottom wall 40 in the direction intersecting a virtual straight line K2 that connects the bottom wall 40 to the parts attaching part 7, a second absorbing part 62b extending to the parts attaching part 7 side along the direction intersecting the first absorbing part 61b from an end part of the first absorbing part 61b separating from the bottom wall 40 and a third absorbing part 63b extending in the direction intersecting the second absorbing part 62b from an end part of the second absorbing part 62b separating from the first absorbing part 61b. Further, the width of a material of the first absorbing part 61b, the second absorbing part 62b and the third absorbing part 63b is formed to be narrower than that of other part of the wiring part 5.

Further, in the present invention, the wiring parts 5 of the bus bars 3a and 3b on which the impact absorbing parts 6a and 6b are provided, the bottom walls 40 of the pressure contact parts 4 and the parts attaching parts 7 are arranged on the same plane. Namely, the impact absorbing parts 6a and 6b are formed in thin shapes which do not require a width in the direction of height. Accordingly, the enlargement of the dimension of height of the bus bar attaching member 1 and the room lamp 10 for a vehicle can be suppressed. Further, the impact absorbing parts 6a and 6b are embedded in the housing 2 so that one side surfaces are exposed. Further, the "one surfaces" are surfaces located on the same plane as the above-described "one surfaces to which the lead parts of the parts attaching parts 7 are attached" and the "surface of a side on which the pressure contact blades 41 of the bottom wall 40 stand upright".

Figure 5:
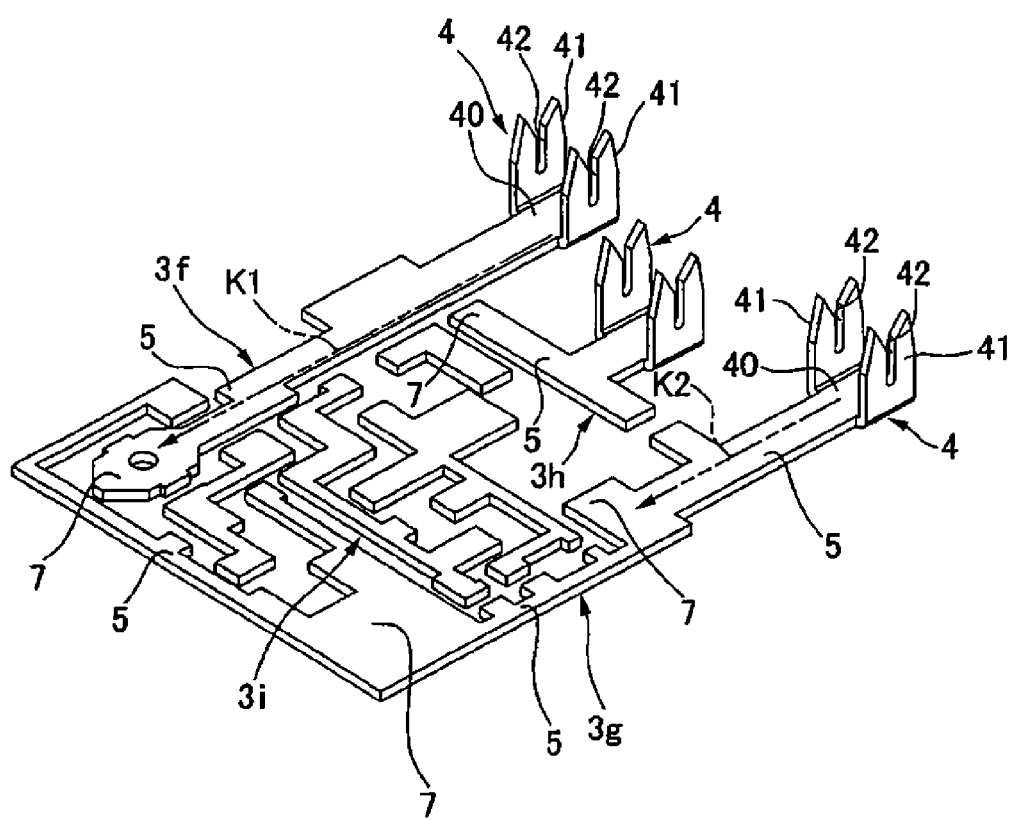
FIG. 5 is a perspective view showing a bus bar of a comparative example.
Figure 6:
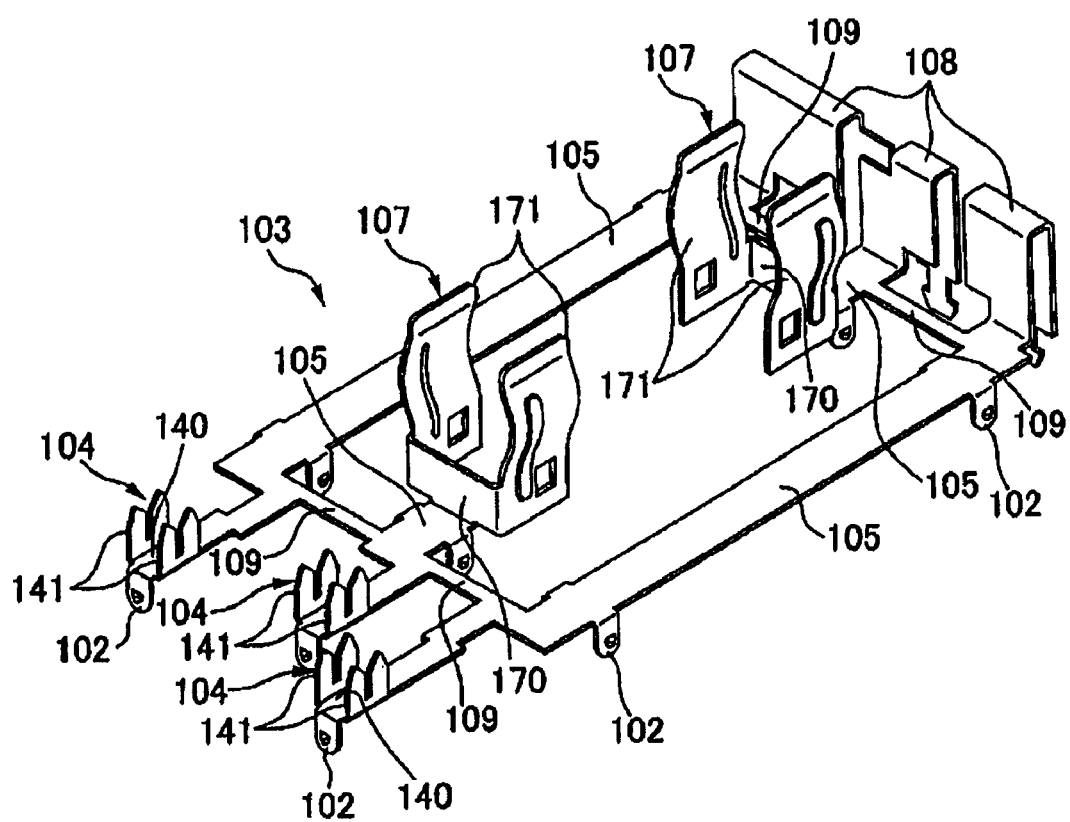
FIG. 6 is a perspective view showing a bus bar forming a usual room lamp for a vehicle.

Further, operational effects of the above-described impact absorbing parts 6a and 6b will be more specifically described by using FIG. 5. In bus bars 3f and 3g of a comparative example shown in FIG. 5, wiring parts 5 located between bottom walls 40 of pressure contact parts 4 and parts attaching parts 7 are configured in forms extending in straight lines along virtual straight lines K1 and K2 that connect the bottom walls 40 to the parts attaching parts 7 and a width of a material is formed to be fixed. When the above-described bus bars 3f and 3g are insert molded to a housing 2, since an impact when an electric wire 8 is pressed in contact with pressure contact blades 41 is directly transmitted to the parts attaching parts 7, there is a fear that electronic parts 11, 12, 13 and 14 attached to the parts attaching parts 7 may possibly get out of the parts attaching parts 7 due to the impact.

As compared therewith, since the bus bars 3a and 3b of the present invention include the impact absorbing parts 6a and 6b configured in the U shaped forms and having the width of the material formed to be narrower than that of other parts of the wiring parts 5, the impact when the electric wire 8 is pressed in contact with the pressure contact blades 41 is absorbed by the impact absorbing parts 6a and 6b and is hardly transmitted to the parts attaching parts 7. Namely, as the impact when the electric wire 8 is pressed in contact with the pressure contact blades 41 is transmitted to the second absorbing parts 62a and 62b from the first absorbing parts 61a and 61b, and then, to the third absorbing parts 63a and 63b from the second absorbing parts 62a and 62b, the impact is gradually damped and hardly transmitted to the parts attaching parts 7. Accordingly, the electronic parts 11, 12 13 and 14 attached to the parts attaching parts 7 can be prevented from getting out of the parts attaching parts 7 due to the impact when the electric wire 8 is pressed in contact with the pressure contact blades 41.

Further, the above-described impact absorbing parts 6a and 6b are configured by punching a flat metal plate in U shaped forms. However, the "impact absorbing part" of the present invention may be configured by punching the flat metal plate in a C shaped form, a V shaped form or a triangular form.

Subsequently, an assembling method of the room lamp 10 for a vehicle having the above-described structure will be described below. Initially, the metal plate is punched and bent to obtain the bus bars 3a, 3b, 3h and 3i. Then, the bus bars 3a, 3b, 3h and 3i are positioned in a molding die of the housing 2 and the molding die is filled with a resin to obtain the bus bar attaching member 1 in which the bus bars 3a, 3b, 3h and 3i are insert molded in the housing 2. Then, to the parts attaching parts 7 of the obtained bus bar attaching member 1, the electronic parts 11, 12, 13 and 14 and the switch are attached. Then, the electric wire 8 is pressed in contact with the pressure contact parts 4. Finally, the cover is attached to the housing 2 to cover the bus bard 3a, 3b, 3h and 3i or the electronic parts 11, 12, 13 and 14 therewith. In such a way, the room lamp 10 for a vehicle is assembled.

As described above, since the bus bar attaching member 1 is obtained by insert molding the bus bars 3a, 3b, 3h and 3i to the housing 2, a process for attaching bus bars to a housing is not necessary as in a usual device.

According to the present invention, since the impact when the electric wire 8 is pressed in contact with the pressure contact blades 41 is hardly transmitted to the parts attaching parts 7, the electronic parts 11, 12, 13 and 14 can be prevented from getting out of the parts attaching parts 7, the enlargement of the dimension of height can be suppressed and the bus bar attaching member 1 and the room lamp 10 for a vehicle can be provided in which the number of assembling processes is small.

Second Embodiment

Figure 4:
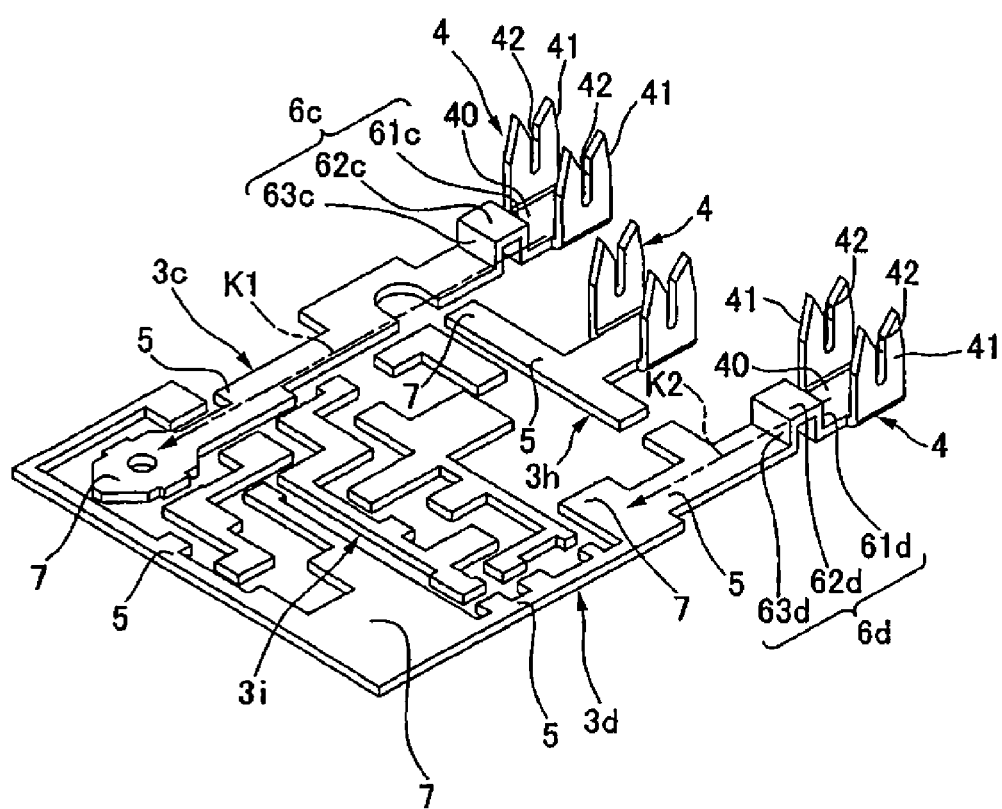
FIG. 4 is a perspective view showing a bus bar according to a second embodiment of the present invention.

A "bus bar attaching member" according to a second embodiment of the present invention is described by referring to FIG. 4. In FIG. 4, the same components as those of the above-described first embodiment are designated by the same reference numerals and an explanation thereof will be omitted.

In the bus bar attaching member of the present embodiment, bus bars 3c and 3d including impact absorbing parts 6c and 6d shown in FIG. 4 are provided in place of the bus bars 3a and 3b of the above-described bus bar attaching member 1 (see FIG. 1). Other structures are the same as those of the bus bar attaching member 1.

The above-described impact absorbing parts 6c and 6d are formed by bending wiring parts 5. Namely, the impact absorbing parts 6c and 6d are configured in U shaped forms by first absorbing parts 61c and 61d standing upright in the same directions as those of pressure contact blades 41 from parts in the vicinity of bottom walls 40 and extending in the directions intersecting virtual straight lines K1 and K2, second absorbing parts 62c and 62d extending to parts attaching parts 7 side along the directions intersecting the first absorbing parts 61c and 61d, that is, along the virtual straight lines K1 and K2 from end parts of the first absorbing parts 61c and 61d separating from the bottom walls 40 and third absorbing parts 63c and 63d extending in the directions intersecting the second absorbing parts 62c and 62d from end parts of the second absorbing parts 62c and 62d separating from the first absorbing parts 61c and 61d.

Namely, in the impact absorbing parts 6c and 6d of the present invention, the wiring parts 5 are bent to protrude in the same directions as those in which the contact pressure blades 41 stand upright from the bottom walls 40 so as not to increase a width in the direction of height. Further, when the wiring parts are bent as described above to form the impact absorbing parts 6c and 6d, the yield of a material of the bus bars 3c and 3d can be more improved than that of the bus bars 3a and 3b. In such a way, the "impact absorbing part" of the present invention may be formed by vertically bending the wiring part 5. Further, the above-described impact absorbing parts 6c and 6d are formed by bending the wiring parts 5 in the U shaped forms in section. However, the "impact absorbing part" of the present invention may be formed by bending the wiring part 5 in a C shaped form in section, a V shaped form in section or a triangular form in section.

Further, the "bus bar attaching member" of the present invention may be applied to other electronic devices than the room lamp 10 for a vehicle The above-described embodiments merely show representative embodiments of the present invention and the present invention is not limited thereto. Various modifications and change may be made within a range without departing the essence of the present invention.

What is claimed is:

1. A bus bar attaching member, comprising:
a housing; and
a bus bar insert molded to the housing, the bus bar including a pressure contact part formed by a bottom wall and pressure contact blades standing upright from edges of the bottom wall and electrically connected to an electric wire with the electric wire pressed in contact with the pressure contact blades, an parts attaching part to which an electronic parts is electrically connected and a wiring part that connect the bottom wall to the parts attaching part;
wherein the wiring part includes an impact absorbing part that prevents an impact when the electric wire is pressed in contact with the pressure contact blades from being transmitted to the parts attaching part in a part located between the bottom wall and the parts attaching part; and
the impact absorbing part is formed by a first absorbing part extending from a part in the vicinity of the bottom wall in the direction intersecting a virtual straight line that connects the bottom wall to the parts attaching part, a second absorbing part extending to the parts attaching part side along the direction intersecting the first absorbing part from an end part of the first absorbing part separating from the bottom wall and a third absorbing part extending in the direction intersecting the second absorbing part from an end part of the second absorbing part separating from the first absorbing part.

2. The bus bar attaching member according to claim 1, wherein the bottom wall, the wiring part and the parts attaching part are arranged on the same plane.

3. The bus bar attaching member according to claim 1, wherein the impact absorbing part is formed by bending the wiring part and the first absorbing part stands upright in the same direction as that of the pressure contact blades from a part in the vicinity of the bottom wall.

4. A room lamp for a vehicle having the bus bar attaching member according to claim 1.

* * * * *